(12) United States Patent
Chen et al.

(10) Patent No.: US 11,228,259 B2
(45) Date of Patent: Jan. 18, 2022

(54) HYBRID ROTARY ENERGY HARVESTER

(71) Applicant: SOOCHOW UNIVERSITY, Suzhou (CN)

(72) Inventors: Tao Chen, Suzhou (CN); Zhan Yang, Suzhou (CN); Huicong Liu, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 504 days.

(21) Appl. No.: 16/312,202

(22) PCT Filed: Nov. 21, 2017

(86) PCT No.: PCT/CN2017/112130
§ 371 (c)(1),
(2) Date: Dec. 20, 2018

(87) PCT Pub. No.: WO2019/090820
PCT Pub. Date: May 16, 2019

(65) Prior Publication Data
US 2021/0226557 A1    Jul. 22, 2021

(30) Foreign Application Priority Data
Nov. 10, 2017    (CN) .......................... 201711103110.0

(51) Int. Cl.
*H02N 1/04*    (2006.01)
*H02K 21/02*    (2006.01)

(52) U.S. Cl.
CPC ............. *H02N 1/04* (2013.01); *H02K 21/026* (2013.01)

(58) Field of Classification Search
CPC .. H02N 1/04; H02N 1/06; H02N 1/08; H02N 1/10; H02N 1/12; H02N 1/00;
(Continued)

(56) References Cited

U.S. PATENT DOCUMENTS

| 4,892,863 A | 1/1990 | Agarwala |
| 8,354,778 B2 * | 1/2013 | Arnold .................. H02N 2/186 |
| | | 310/370 |

(Continued)

FOREIGN PATENT DOCUMENTS

| CN | 101997385 A | 3/2011 |
| CN | 103546058 A | 1/2014 |

(Continued)

*Primary Examiner* — Ahmed Elnakib
(74) *Attorney, Agent, or Firm* — SZDC Law P.C.

(57) ABSTRACT

The present invention relates to an energy harvester, including: a base; an electromagnetic coil fixed in the base; a disk-shaped stator magnet fixed at the center of the base; a friction plate fixing ring fixed on the base; at least one friction plate unit fixed on an inner side surface of the friction plate fixing ring; a disk-shaped rotor magnet whose bottom is in contact with the electromagnetic coil, wherein the disk-shaped rotor magnet is attracted and held to the disk-shaped stator magnet, and an outer surface of the disk-shaped rotor magnet is tangent to an outer surface of the disk-shaped stator magnet; and an annular friction plate fixed on the disk-shaped rotor magnet, wherein the annular friction plate and a friction plate are made of materials with different polarities. The foregoing energy harvester has a simple structure and high electrical energy output efficiency.

10 Claims, 6 Drawing Sheets

(58) Field of Classification Search
CPC ........ H02N 1/002; H02N 1/004; H02N 1/006;
H02N 1/008; H02K 1/182; H02K 1/2793;
H02K 21/026; H02K 21/24; H02K 37/08;
H02K 37/125; H02K 49/046; H02K
49/108; H02K 35/00; H02K 35/02
USPC .................................................. 310/309, 310
See application file for complete search history.

(56) References Cited

U.S. PATENT DOCUMENTS

| | | | | |
|---|---|---|---|---|
| 2009/0171404 | A1* | 7/2009 | Irani | H02K 35/02 |
| | | | | 607/2 |
| 2009/0261689 | A1* | 10/2009 | Fang | H02K 53/00 |
| | | | | 310/319 |
| 2011/0048133 | A1* | 3/2011 | Lin | H01L 41/1136 |
| | | | | 73/514.34 |
| 2017/0163179 | A1* | 6/2017 | Yoo | H02N 2/186 |

FOREIGN PATENT DOCUMENTS

| | | | |
|---|---|---|---|
| CN | 105634205 A | | 6/2016 |
| CN | 105846642 A | | 8/2016 |
| CN | 106160396 | * | 11/2016 |
| CN | 106160396 A | | 11/2016 |
| CN | 106208801 A | | 12/2016 |
| CN | 107294341 A | | 10/2017 |
| CN | 207459955 U | | 6/2018 |
| WO | 2016147038 A1 | | 9/2016 |

\* cited by examiner

HYBRID ROTARY ENERGY HARVESTER

This application is the National Stage Application of PCT/CN2017/112130, filed on Nov. 21, 2017, which claims priority to Chinese Patent Application No. 201711103110.0, filed on Nov. 10, 2017, which is incorporated by reference for all purposes as if fully set forth herein.

FIELD OF THE INVENTION

The present invention relates to energy harvesting, and in particular, to an energy harvester.

BACKGROUND OF THE INVENTION

Wireless sensor networks have been widely applied to the fields such as military, intelligent traffic, and environmental monitoring. Since sensor nodes are deployed in complex environments and actual application requirements are special, common electrical systems cannot be used to power such nodes. If batteries are used to power nodes, the costs are high, the service life is short, and replacement is inconvenient. Various abundant energy sources are present in natural environments. Energy harvesting is a technology of acquiring energy from external environments and converting the energy into electrical energy, which is a potential way of solving a power supply problem of wireless sensor nodes. The harvesting of kinetic energy from environments and conversion of the kinetic energy into electrical energy have advantages of being green and environmentally friendly, having wide sources, and being capable of working for a long time.

However, since environmental vibration sources generally have low frequencies and wide frequency bands, the amplitudes, frequencies, and directions of vibrations are highly random. A current resonant vibration energy harvester usually has a relatively narrow working band and a single vibration direction. As a result, a common problem is that the applicable vibration range is narrow and the output power density is low, so it is difficult to satisfy self-powering requirement of a wireless sensor node.

There exist the following technical problems in prior art:

Currently, a vibration energy harvesting apparatus generally has a high working frequency (greater than 10 Hz), a relatively narrow working band, and a single vibration direction, leading to poor environmental adaptability. The apparatus has a low power output in an environment with vibrations at low frequencies less than 10 Hz. An energy harvester with a single mechanism has a limited output and cannot satisfy powering requirement of a low power consumption sensor node.

SUMMARY OF THE INVENTION

Based on this, in order to solve the foregoing technical problems, it is necessary to provide an energy harvester with a simple structure and high electrical energy output efficiency.

An energy harvester, comprising:
a base;
an electromagnetic coil fixed in the base;
a disk-shaped stator magnet fixed at the center of the base;
a friction plate fixing ring fixed on the base;
at least one friction plate unit fixed on an inner side surface of the friction plate fixing ring, wherein the friction plate unit includes a conductive metal sheet and a friction plate tightly attached on a surface of the conductive metal sheet, or the friction plate unit includes an elastic substrate, a conductive metal sheet located on a surface of the elastic substrate and a friction plate tightly attached to the conductive metal sheet, or the friction plate unit includes a conductive metal sheet and two friction plates tightly attached on two surfaces of the conductive metal sheet separately, or the friction plate unit includes an elastic substrate, two conductive metal sheets located on two surfaces of the elastic substrate separately and two friction plates tightly attached to the two conductive metal sheets separately;

a disk-shaped rotor magnet whose bottom is in contact with the electromagnetic coil, wherein the disk-shaped rotor magnet is attracted and held to the disk-shaped stator magnet, and an outer surface of the disk-shaped rotor magnet is tangent to an outer surface of the disk-shaped stator magnet; and an annular friction plate fixed on the disk-shaped rotor magnet, wherein the annular friction plate and the friction plate are made of materials with different polarities.

The foregoing energy harvester has a simple structure and high electrical energy output efficiency.

In another embodiment, the friction plate is made of a fluorinated ethylene propylene (FEP) copolymer, and the annular friction plate is made of copper.

In another embodiment, there are two or three or four friction plate units annularly and uniformly distributed on the inner side surface of the friction plate fixing ring.

In another embodiment, four electromagnetic coil grooves are annularly and uniformly distributed in the base, the electromagnetic coil includes four first electromagnetic coils connected in series, and the four first electromagnetic coils are separately fixed in the four electromagnetic coil grooves.

In another embodiment, the conductive metal sheet is a copper sheet.

In another embodiment, the elastic substrate is made of rubber or paper or plastics.

In another embodiment, the friction plate fixing ring includes four friction plate fixing ring sheets fixed together, each of the friction plate fixing ring sheets includes a friction plate fixing ring sheet body and fixing lugs formed by two ends of the friction plate fixing ring sheet body extending separately, each of the fixing lugs has a fixing through hole, and two adjacent friction plate fixing ring sheets are fixedly connected by a bolt passing through the fixing through holes on respective fixing lugs.

In another embodiment, the friction plate fixing ring includes two friction plate fixing ring sheets fixed together, each of the friction plate fixing ring sheets includes a friction plate fixing ring sheet body and fixing lugs formed by two ends of the friction plate fixing ring sheet body extending separately, each of the fixing lugs has a fixing through hole, and the two friction plate fixing ring sheets are fixedly connected by a bolt passing through the fixing through holes on respective fixing lugs.

In another embodiment, the disk-shaped stator magnet is fixed at the center of the base through a bolt or the disk-shaped stator magnet is bonded at the center of the base by adhesive.

In another embodiment, the energy harvester further includes a top cover covering the friction plate fixing ring.

DETAILED DESCRIPTION OF THE EMBODIMENTS

To make the objectives, technical solutions, and advantages of the present invention more comprehensible, the present invention is further illustrated in detail below with reference to the accompanying drawings and the embodiments. It should be understood that the described specific embodiments are only used to explain the present invention rather than to limit the present invention.

Figure 1:
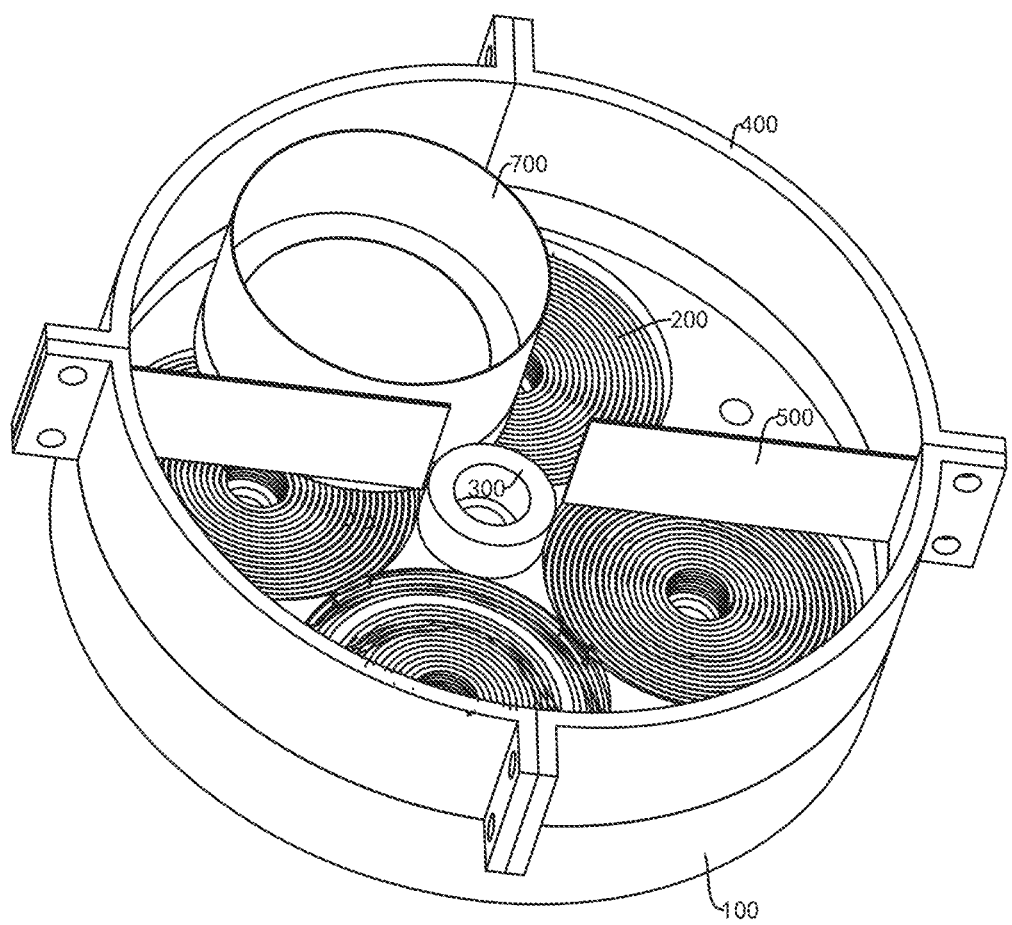
FIG. 1 is a schematic structural diagram of an energy harvester (with a top cover removed) according to an embodiment of the present application.

Referring to FIG. 1, an energy harvester, comprising: a base; an electromagnetic coil fixed in the base; a disk-shaped stator magnet fixed at the center of the base; a friction plate fixing ring fixed on the base; at least one friction plate unit fixed on an inner side surface of the friction plate fixing ring; a disk-shaped rotor magnet whose bottom is in contact with the electromagnetic coil, wherein the disk-shaped rotor magnet is attracted and held to the disk-shaped stator magnet, and an outer surface of the disk-shaped rotor magnet is tangent to an outer surface of the disk-shaped stator magnet; and an annular friction plate fixed on the disk-shaped rotor magnet, wherein the annular friction plate and a friction plate are made of materials with different polarities.

There is no limitation on the shape of the base in this embodiment. The base in FIG. 1 is merely a possible example, and an appropriate variation may be made according to the effect of the base.

Figure 2:
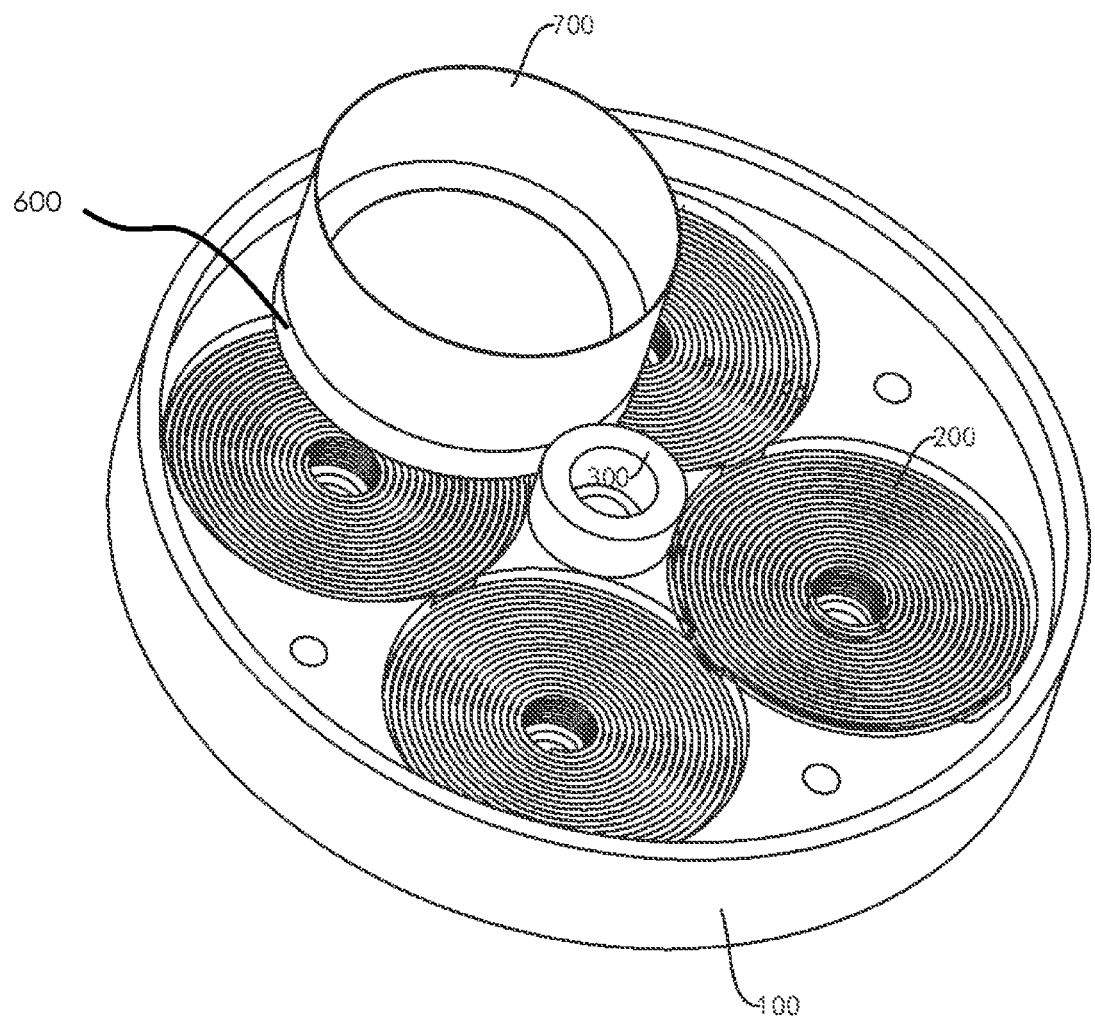
FIG. 2 is a schematic structural diagram of an energy harvester (with a top cover, a friction plate fixing ring, and a friction plate unit removed) according to an embodiment of the present application.

Referring to FIG. 1 and FIG. 2, in another embodiment, four electromagnetic coil grooves are annularly and uniformly distributed in the base, the electromagnetic coil includes four first electromagnetic coils connected in series, and the four first electromagnetic coil are separately fixed in the four electromagnetic coil grooves. In this case, with such coil distribution, a relatively high voltage is generated when magnetic field lines are cut across by the disk-shaped rotor magnet. It can be understood that only one possible example is provided in this embodiment. For example, the electromagnetic coil is one electromagnetic coil or includes two small electromagnetic coils connected in series, and a person skilled in the art can make appropriate variations according to actual requirements.

In another embodiment, the disk-shaped stator magnet is fixed at the center of the base through a bolt or the disk-shaped stator magnet is bonded at the center of the base through adhesive. Certainly, the disk-shaped stator magnet can also be fixed at the center of the base in another manner, for example, by using a buckle.

For the friction plate fixing ring fixed on the base, the friction plate fixing ring may be fixed on the base by adhesive, and certainly, it can also be fixed in a manner of a buckle.

Figure 3:
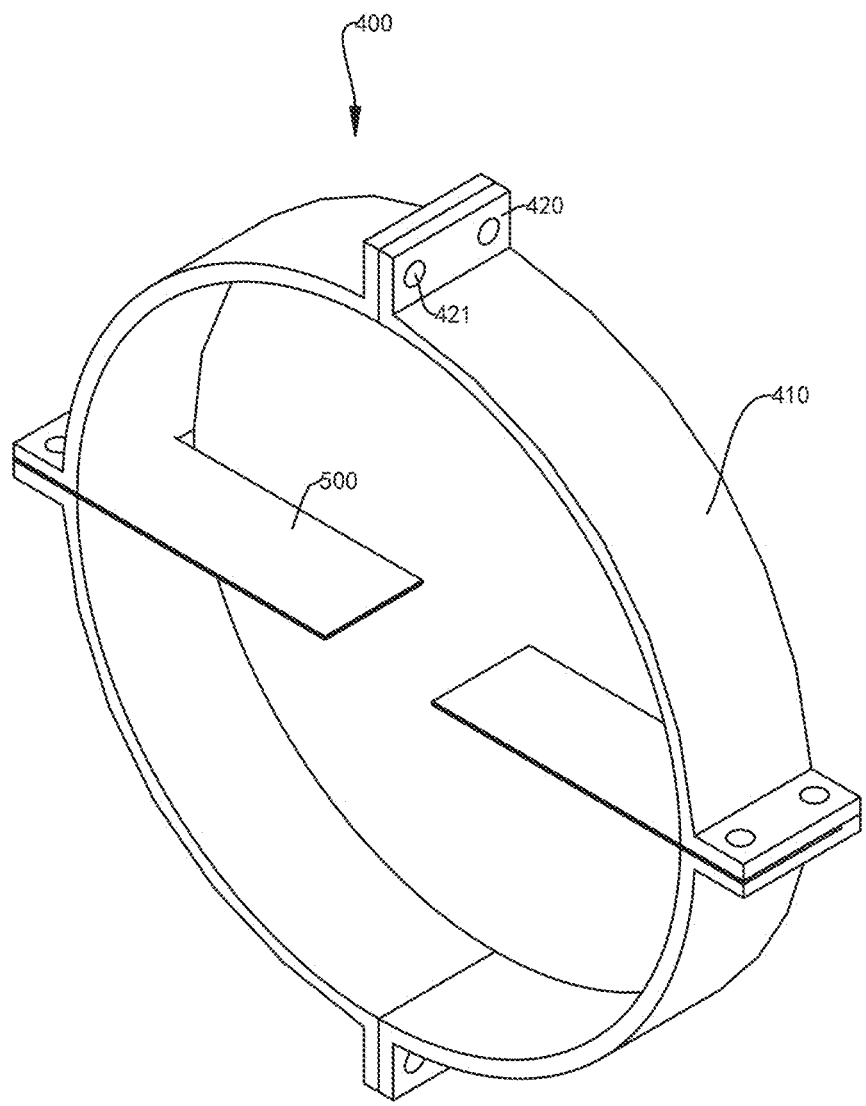
FIG. 3 is a schematic structural diagram of a friction plate fixing ring and a friction plate unit in an energy harvester according to an embodiment of the present application.

Referring to FIG. 3, in another embodiment, the friction plate fixing ring includes four friction plate fixing ring sheets fixed together, each of the friction plate fixing ring sheets includes a friction plate fixing ring sheet body and fixing lugs formed by two ends of the friction plate fixing ring sheet body extending separately, each of the fixing lugs has a fixing through hole, and two adjacent friction plate fixing ring sheets are fixedly connected by a bolt passing through the fixing through hole on respective fixing lugs. In this case, it is convenient to disassemble or assemble the friction plate fixing ring.

In another embodiment, the friction plate fixing ring includes two friction plate fixing ring sheets fixed together, each of the friction plate fixing ring sheets includes a friction plate fixing ring sheet body and fixing lugs formed by two ends of the friction plate fixing ring sheet body extending separately, each of the fixing lugs has a fixing through hole, and the two friction plate fixing ring sheets are fixedly connected by a bolt passing through the fixing through hole on respective fixing lugs. In this case, it is convenient to disassemble or assemble the friction plate fixing ring.

In another embodiment, there are two or three or four friction plate units annularly and uniformly distributed on the inner side surface of the friction plate fixing ring. When there are two friction plate units, the effect of power generation is more desirable.

The friction plate unit includes a conductive metal sheet and a friction plate tightly attached on a surface of the conductive metal sheet (which is a first structure, i.e. a conductive metal sheet-a friction plate), or the friction plate unit includes an elastic substrate, a conductive metal sheet located on a surface of the elastic substrate, and a friction plate tightly attached to the conductive metal sheet (which is a second structure, i.e. an elastic substrate-a conductive metal sheet-a friction plate), or the friction plate unit includes a conductive metal sheet and two friction plates tightly attached on two surfaces of the conductive metal sheet separately (which is a third structure, i.e. a friction plate-a conductive metal sheet-a friction plate), or the friction plate unit includes an elastic substrate, two conductive metal sheets located on two surfaces of the elastic substrate separately, and two friction plates tightly attached to the two conductive metal sheets separately (which is a fourth structure, i.e. a friction plate-a conductive metal sheet-an elastic substrate-a conductive metal sheet-a friction plate).

For a structure that includes two friction plates, electricity can be generated through rotation and friction of the disk-shaped rotor magnet in any direction. For a structure that includes only one friction plate, electricity can be generated through rotation and friction in only a direction in which friction can occur between the disk-shaped rotor magnet and the friction plate, that is, electricity can be generated through friction in only a single direction.

For a structure that includes an elastic substrate, under the effect of the elastic substrate, the friction plate unit can restore the original position after being hit by the disk-shaped rotor magnet, to ensure that a largest contact area of friction is kept during hit and friction next time.

It may be understood that when there are at least two friction plate units, the friction plate units can be any combination of the above four structures.

In another embodiment, the conductive metal sheet is a copper sheet.

In another embodiment, the elastic substrate is made of rubber or paper or plastic.

The annular friction plate and the friction plate are made of materials with different polarities. This means that the annular friction plate and the friction plate are made of friction materials with opposite polarities. It may be understood that the annular friction plate may use a positive friction material, and in contrast, the friction plate uses a negative friction material. Certainly, the annular friction plate may use a negative friction material, and in contrast, the friction plate uses a positive friction material. When friction occurs between the annular friction plate and the friction plate, a surface of the positive friction material carries positive charges, and a surface of the negative friction material carries negative charges.

In another embodiment, the electrodes made of positive and negative friction materials use a metal, an alloy or a metal oxide whose resistivity is less than 1 mΩ·cm. In another embodiment, the positive friction material is a material that easily loses electrons and becomes positively charged, and is selected from silicon oxide, glass, nylon, metal aluminum, metal copper or metal gold. In another embodiment, the negative friction material is a material that accepts electrons easily and becomes negatively charged, and is selected from polytetrafluoroethylene, polyimide, parylene, polydimethylsiloxane or polyethylene terephthalate.

In another embodiment, the friction plate is made of an FEP copolymer, and the annular friction plate is made of copper.

Figure 4:
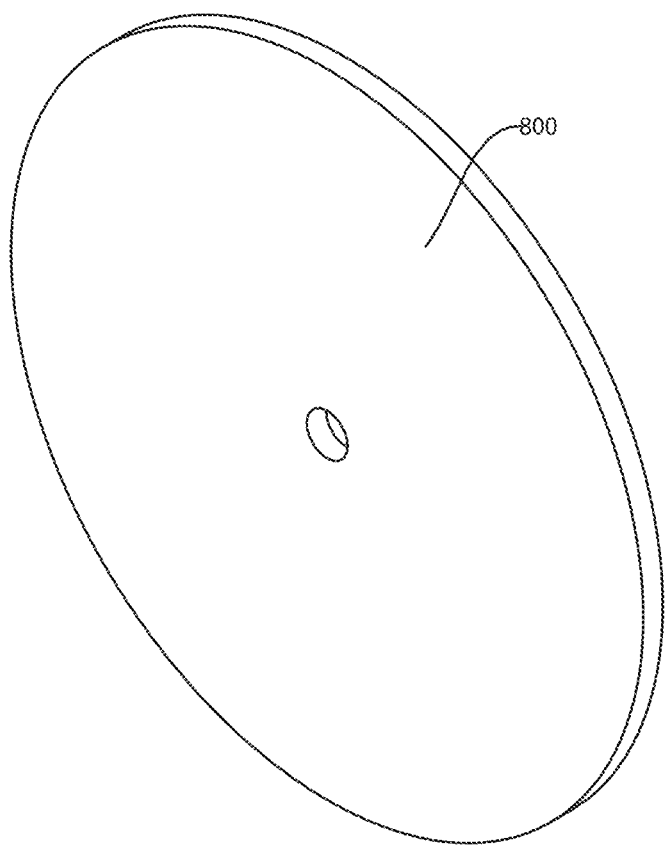
FIG. 4 is a schematic structural diagram of a top cover in an energy harvester according to an embodiment of the present application.

Referring to FIG. 4, in another embodiment, the energy harvester further includes a top cover covering the friction plate fixing ring. The disk-shaped rotor magnet may be prevented from flying away from the base due to a relatively high rotational speed when the disk-shaped rotor magnet rotates around the disk-shaped stator magnet. That is, non-circumferential displacement of the disk-shaped rotor magnet is limited. The top cover can be fixed together with the friction plate fixing ring (in a fixing manner such as adhesive or a buckle). Alternatively, a bolt may pass through a through hole on the top cover and then pass through a through hole on the disk-shaped stator magnet to be fixed on the base. In an embodiment that includes a top cover, the friction plate fixing ring and the base may be fixed in a manner other than the manner (adhesive or a buckle) in the foregoing embodiment. A bolt passes through a through hole on the top cover and then passes through a through hole on the disk-shaped stator magnet to be fixed on the base, and at the same time the friction plate fixing ring is held between the top cover and the base. In this case, a hybrid rotary energy harvester is assembled more flexibly.

One specific application of this application is described below:

Referring to FIG. 1 to FIG. 4, an energy harvester includes: a base 100; an electromagnetic coil 200 fixed in the base; a disk-shaped stator magnet 300 fixed at the center of the base; a friction plate fixing ring 400 fixed on the base; two friction plate units 500 annularly and uniformly distributed on the inner side surface of the friction plate fixing ring, wherein each of the friction plate units includes an elastic substrate, two conductive metal sheets located on two surfaces of the elastic substrate separately, and two friction plates tightly attached to the two conductive metal sheets separately, the elastic substrate is made of paper, each of the conductive metal sheets is a copper sheet, and each of the friction plates is made of an FEP copolymer; a disk-shaped rotor magnet 600 whose bottom is in contact with the electromagnetic coil, wherein the disk-shaped rotor magnet is attracted and held to the disk-shaped stator magnet, and an outer surface of the disk-shaped rotor magnet is tangent to an outer surface of the disk-shaped stator magnet; an annular friction plate 700 fixed on the disk-shaped rotor magnet, wherein the annular friction plate is made of copper; and a top cover 800 covering the friction plate fixing ring. Four electromagnetic coil grooves are annularly and uniformly distributed in the base, the electromagnetic coil includes four first electromagnetic coils connected in series, and the four first electromagnetic coils are separately fixed in the four electromagnetic coil grooves. The friction plate fixing ring includes four friction plate fixing ring sheets fixed together, each of the friction plate fixing ring sheets includes a friction plate fixing ring sheet body 410 and fixing lugs 420 formed by two ends of the friction plate fixing ring sheet body extending separately, each of the fixing lugs has a fixing through hole 421, and two adjacent friction plate fixing ring sheets are fixedly connected by a bolt passing through fixing through holes on respective fixing lugs.

Figure 5:
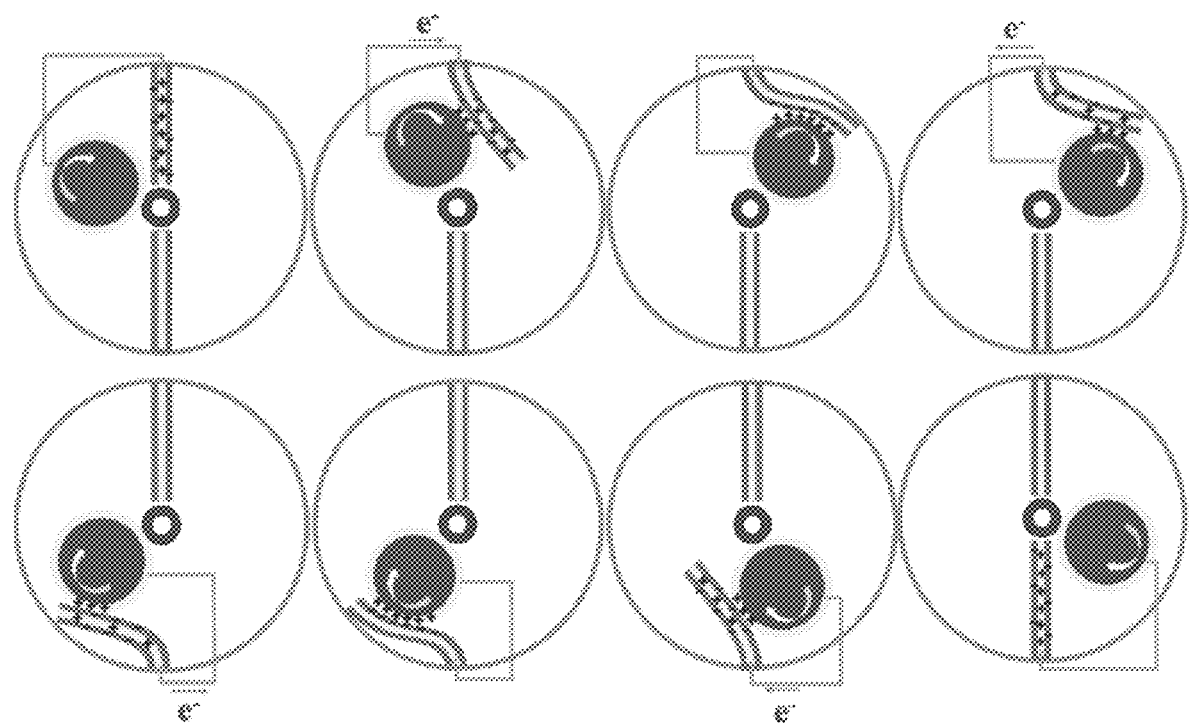
FIG. 5 is a schematic diagram of working principle of an energy harvester according to an embodiment of the present application.

FIG. 5 is a dynamic schematic diagram of working principle of an energy harvester according to an embodiment of this application, and is a schematic diagram that shows that the disk-shaped rotor magnet rotates around the disk-shaped stator magnet by nearly one whole circle (the upper half portion moves from left to right, and the lower half portion moves from right to left).

Figure 6:
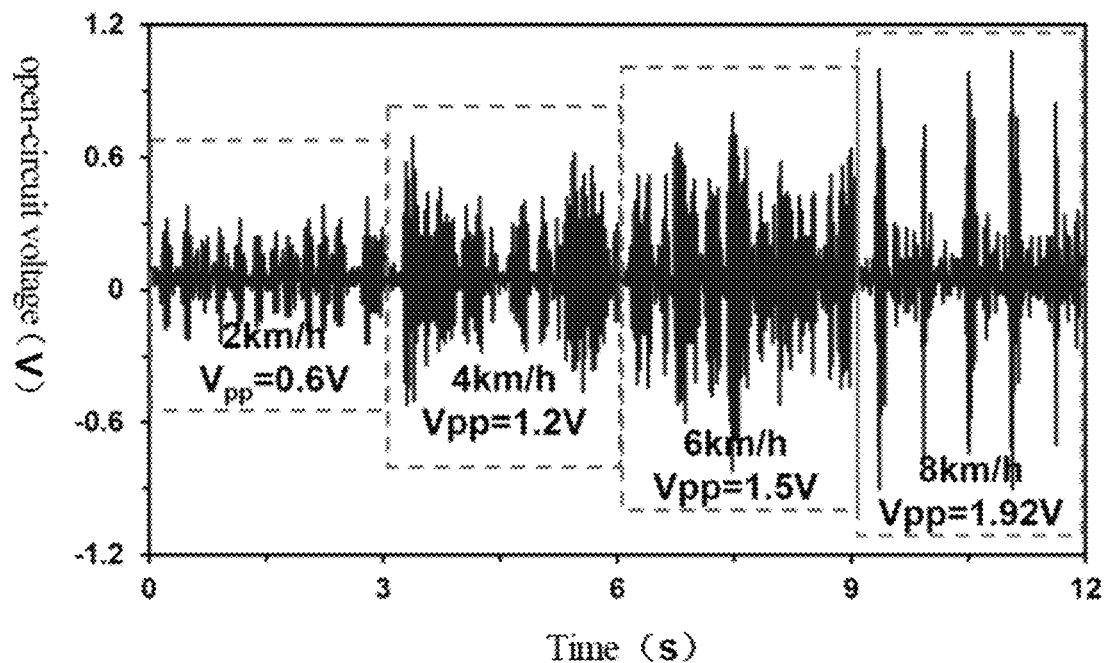
FIG. 6 is a testing diagram of an electromagnetic power generation portion of an energy harvester according to an embodiment of the present application.
Figure 7:
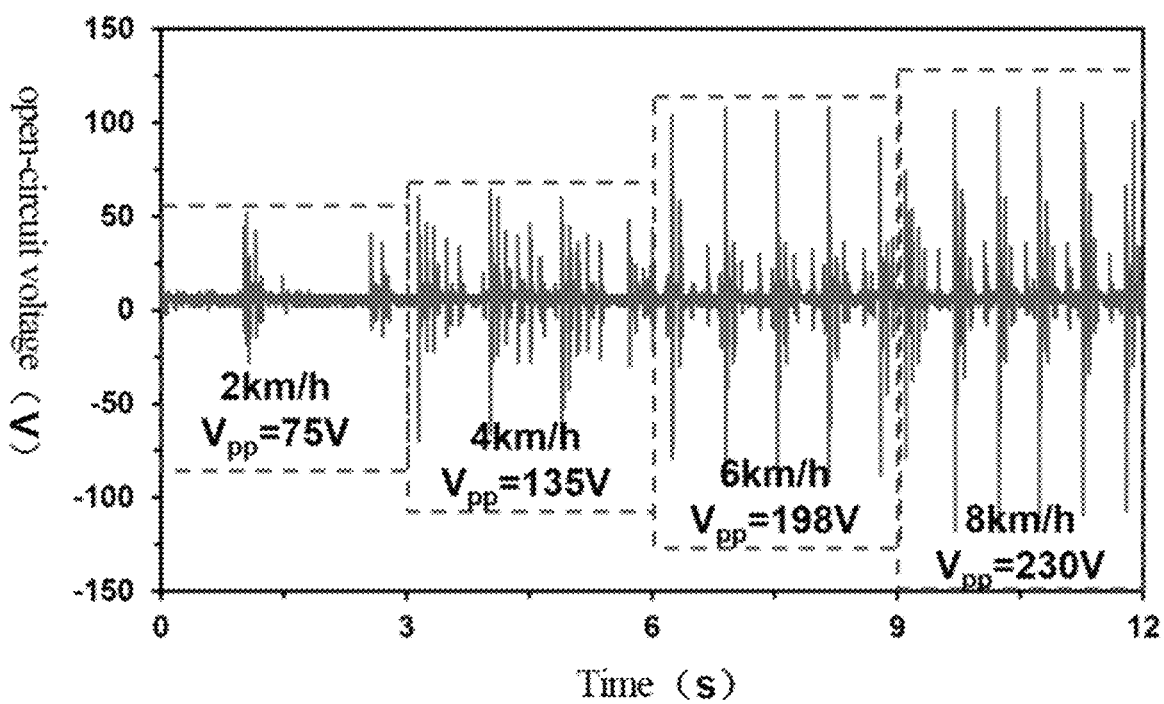
FIG. 7 is a testing diagram of a friction power generation portion of an energy harvester according to an embodiment of the present application.

FIG. 6 and FIG. 7 are testing diagrams of an energy harvester according to an embodiment of this application, and are diagrams showing voltages output by an electromagnetic power generation portion (power generation through friction between the disk-shaped rotor magnet and the electromagnetic coil) and a triboelectric effect portion (power generation through friction between the friction plate and the annular friction plate) when the apparatus is fixed at a person's ankle and the person runs on a treadmill at 2 km/h, 4 km/h, 6 km/h, and 8 km/h.

A stator magnet and a rotor magnet are introduced in the hybrid rotary energy harvester in this application. Under random excitation by external low frequencies, the rotor magnet rotates around the stator magnet and at the same time makes a movement relative to circumferentially distributed electromagnetic coils, to generate an electrical power output. The stator magnet and the rotor magnet are both disk-shaped structures with a certain thicknesses. The stator magnet is located at the center. Because of forces of attraction between magnets, the rotor magnet is attracted at an edge of the stator magnet. Minor external disturbances can excite the rotor magnet to be tightly attached to the edge of the stator magnet to make a reciprocating movement (rotate in one direction first and then rotate in another direction) or a circumferential movement. In the apparatus, the rotation of a rotor does not require another auxiliary rotating structure, and during rotation of the rotor, a frictional resistance is far less than that of another rotating structure such as a bearing that has a clearance fit. In the hybrid rotary energy harvester, a copper ring made of a metal copper foil is fixed on the rotor magnet. When the rotor magnet rotates in both directions, friction can occur between the rotor magnet and a friction plate that is fixed on a wall of the apparatus and is made of an FEP copolymer copper foil electrode and a substrate, to produce a triboelectric effect, so as to generate electricity that can be output. With the rotor magnet and the stator magnet used as media, combining principles of electromagnetic power generation and a triboelectric effect a hybrid rotary energy harvester is designed.

The hybrid rotary energy harvester in this application does not need other additional auxiliary vibrating or rotating structure such as a spring and a bearing to achieve relative movement of a rotor magnet and a coil. When forces of attraction between magnets are used, the structure is simple, and a frictional resistance is small, so that it is very easy to implement a reciprocating or rotating movement under excitation of a minor disturbance. Energy in different vibration excitation directions can be harvested and different vibration excitation frequencies can be efficiently output, so that the working frequency is low, the frequency band is wide, and the application range is wide. The apparatus can adapt to various vibration environments, so that the application range is wide. The apparatus can be applied to energy harvesting in relatively complex vibration working conditions, and in addition can be applied to harvesting of random human kinetic energy and harvesting of ocean wave energy. The characteristics of these environmental kinetic energy include low vibration frequencies and highly random amplitudes, frequencies, and directions of vibrations. When the apparatus is working, i.e. when the rotor magnet is rotating, electromagnetic power generation and a triboelectric effect occur at the same time, thereby improving the efficiency of outputting electrical energy.

The technical features in the foregoing embodiments can be combined in any manner. For simple description, not all possible combinations of the technical features in the foregoing embodiments are described. However, a combination of these technical features should be considered falling within the scope recorded in the specification provided if only no contradiction exists in the combination.

Several implementations of the present invention are described in the foregoing embodiments, and the implementations are described in a relatively detailed manner, but cannot be accordingly understood as a limitation to the patent scope of the invention. It should be noted that a person of ordinary skill in the art can further make several variations and improvements without departing from the concept of the present invention. All these variations and improvements fall within the protection scope of the present invention. Therefore, the protection scope of the patent of the present invention shall be as defined by the appended claims.

What is claimed is:

1. An energy harvester, comprising:
a base;
an electromagnetic coil fixed in the base;
a disk-shaped stator magnet fixed at the center of the base;
a friction plate fixing ring fixed on the base;
at least one friction plate unit fixed on an inner side surface of the friction plate fixing ring, wherein the friction plate unit comprises a conductive metal sheet and a friction plate tightly attached on a surface of the conductive metal sheet, or the friction plate unit comprises an elastic substrate, a conductive metal sheet located on a surface of the elastic substrate and a friction plate tightly attached to the conductive metal sheet, or the friction plate unit comprises a conductive metal sheet and two friction plates tightly attached on two surfaces of the conductive metal sheet separately, or the friction plate unit comprises an elastic substrate, two conductive metal sheets located on two surfaces of the elastic substrate separately and two friction plates tightly attached to the two conductive metal sheets separately;
a disk-shaped rotor magnet whose bottom is in contact with the electromagnetic coil, wherein the disk-shaped rotor magnet is attracted and held to the disk-shaped stator magnet, and an outer surface of the disk-shaped rotor magnet is tangent to an outer surface of the disk-shaped stator magnet; and
an annular friction plate fixed on the disk-shaped rotor magnet, wherein
the annular friction plate and the friction plate are made of triboelectric materials with different charge polarities.

2. The energy harvester according to claim 1, wherein the friction plate is made of a fluorinated ethylene propylene (FEP) copolymer, and the annular friction plate is made of copper.

3. The energy harvester according to claim 1, wherein there are two or three or four friction plate units annularly and uniformly distributed on the inner side surface of the friction plate fixing ring.

4. The energy harvester according to claim 1, wherein four electromagnetic coil grooves are annularly and uniformly distributed in the base, the electromagnetic coil comprises four first electromagnetic coils connected in series, and the four first electromagnetic coils are separately fixed in the four electromagnetic coil grooves.

5. The energy harvester according to claim 1, wherein the conductive metal sheet is a copper sheet.

6. The energy harvester according to claim 1, wherein the elastic substrate is made of rubber or paper or plastics.

7. The energy harvester according to claim 1, wherein the friction plate fixing ring comprises four friction plate fixing ring sheets fixed together, each of the friction plate fixing ring sheets comprises a friction plate fixing ring sheet body and fixing lugs formed by two ends of the friction plate fixing ring sheet body extending separately, each of the fixing lugs has a fixing through hole, and two adjacent friction plate fixing ring sheets are fixedly connected by a bolt passing through fixing through holes on respective fixing lugs.

8. The energy harvester according to claim 1, wherein the friction plate fixing ring comprises two friction plate fixing ring sheets fixed together, each of the friction plate fixing ring sheets comprises a friction plate fixing ring sheet body and fixing lugs formed by two ends of the friction plate fixing ring sheet body extending separately, each of the fixing lugs has a fixing through hole, and the two friction plate fixing ring sheets are fixedly connected by a bolt passing through fixing through holes on respective fixing lugs.

9. The energy harvester according to claim 1, wherein the disk-shaped stator magnet is fixed at the center of the base through a bolt or the disk-shaped stator magnet is bonded at the center of the base through adhesive.

10. The energy harvester according to claim 1, further comprising a top cover covering the friction plate fixing ring.

* * * * *